Figure 1:
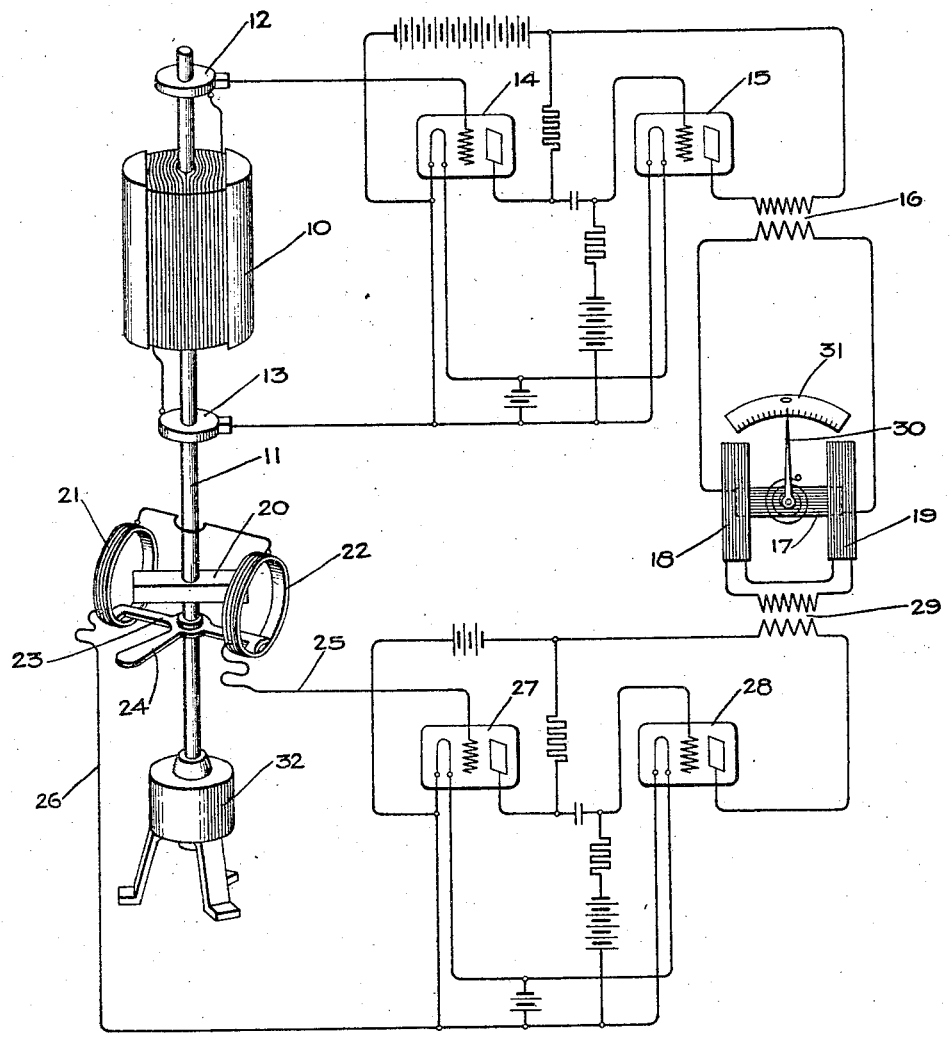

Aug. 26, 1930.  J. D. TEAR  1,774,458
COMPASS
Filed Sept. 22, 1927   2 Sheets-Sheet 1

Inventor:
James D. Tear,
by Alexander S. ____
His Attorney.

Aug. 26, 1930.　　　　J. D. TEAR　　　　1,774,458
COMPASS
Filed Sept. 22, 1927　　　2 Sheets-Sheet 2
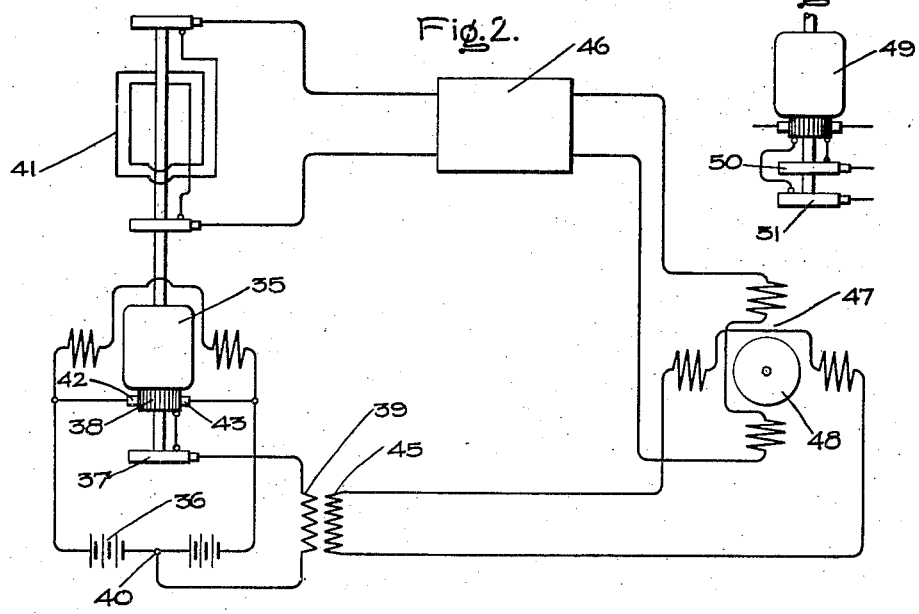
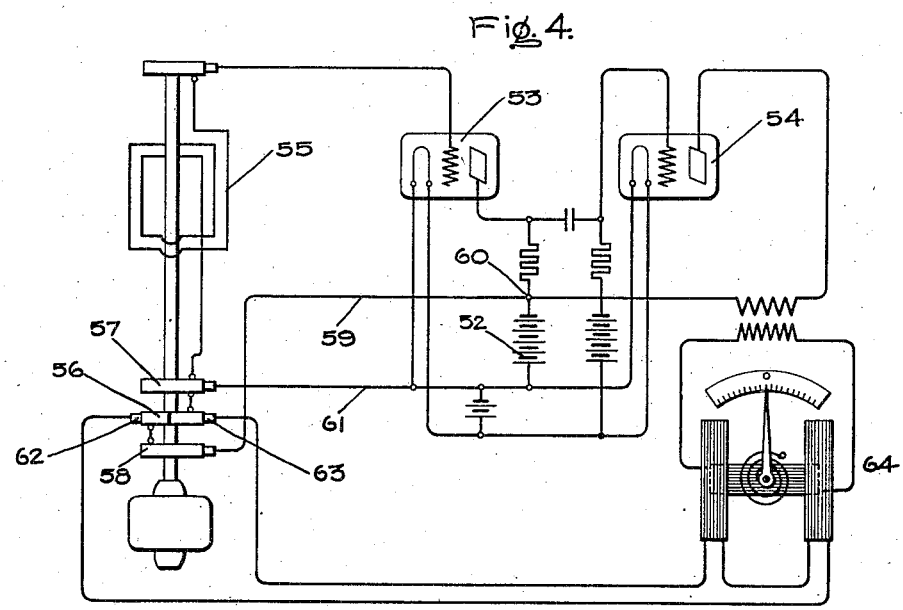
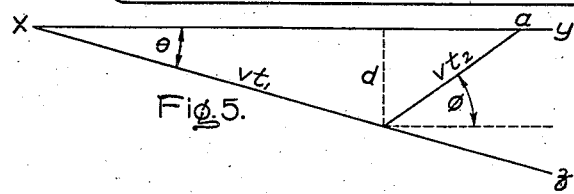
Inventor:
James D. Tear,
by
His Attorney.

Patented Aug. 26, 1930

1,774,458

UNITED STATES PATENT OFFICE

JAMES D. TEAR, OF SCHENECTADY, NEW YORK, ASSIGNOR TO GENERAL ELECTRIC COMPANY, A CORPORATION OF NEW YORK

COMPASS

Application filed September 22, 1927. Serial No. 221,325.

My invention relates to compasses, more particularly to electromagnetic compasses of the earth inductor type, and has for its object the provision of an accurate and reliable device of this character.

My invention has general application in the guiding of ships, etc., where the well-known magnetic compass is commonly used. It has particular application, however, to air planes the unstable conditions of flight of which have been found to seriously affect the accuracy of the magnetic compass.

In carrying out my invention in one form, I produce two alternating electromotive forces the phase relation of which depends upon the angular position or direction of movement of the ship. One of these electromotive forces is generated by means of a winding which is rotated in the earth's magnetic field while the other electromotive force is produced by an electrical device driven with this winding. The phase relation of the latter electromotive force with relation to that induced by the earth's magnetic field, is dependent upon the angular position of the stator of the electrical device, and I provide indicating means which is responsive to the phase relation of the two electromotive forces so as to indicate the angular position of the stator member, and, therefore the angular position of the object or ship, such as an airplane, to which the stator is secured. It is contemplated that the stator member will be secured in an adjusted position on the airplane so as to turn therewith and produce a displacement in the phase relation of the electromotive forces upon any deviation of the airplane from a predetermined direction of flight, such deviation being shown by the indicating means.

For a more complete understanding of my invention reference should be had to the accompanying drawing Fig. 1 of which is a diagrammatic representation of a compass system embodying my invention; Figs. 2, 3 and 4 are diagrammatic representations of modified forms of my invention; while Fig. 5 is a vector diagram showing the operation of the system.

Referring to the drawing, my invention in one form comprises an armature member 10 which is mounted on a shaft 11 rotating about a substantially vertical axis. This armature member 10 may be made of a suitable insulating material, such as a phenolic condensation product, and it is provided with an inductor coil or winding having a large number of turns whereby alternating electromotive forces are induced in the coil by the earth's magnetic field when the armature is rotated about its vertical axis. The terminals of the armature winding are connected to insulated slip rings 12 and 13 on the shaft 11. with which cooperate suitable brushes. The brushes are connected to the input circuit of a suitable power amplifying device, shown as a two-stage electron tube amplifier comprising electron discharge amplifying devices 14 and 15. The output circuit of the discharge device 15 is connected through a transformer 16 to one winding, as shown the rotor winding or coil 17, of a suitable phase responsive indicating device.

As shown the phase responsive device is provided with stationary coils 18 and 19 mounted on a common axis on opposite sides of the rotor coil 17 and energized by an alternating electromotive force, the phase of which with respect to the phase of the electromotive force generated in the armature 10 depends upon the angular position of the support, such as an airplane. This electromotive force is obtained by a suitable electrical device, such as generating means driven by or with the armature 10. As shown, the generating device comprises a bar magnet 20 which is secured at its center on the shaft 11 so as to extend transversely with respect to the shaft. This magnet is inductively related to two coils 21 and 22, constituting armature coils, which are mounted on opposite ends of an adjustable arm 23. The arm 23 is pivotally mounted so as to be adjustable about the axis of the shaft 11, a suitable handle 24 being provided. The coils 21 and 22 are thus mounted adjacent opposite ends of the magnet 20 so as to be interlinked by the field of the magnet, whereby alternating electromotive forces having the same frequency as those induced in the armature 10 are induced in them by rotation of the magnet.

The coils 21 and 22 are connected together, as shown in series, and the two terminals of the coil circuit are connected through conductors 25 and 26 to suitable power amplifying means shown as a two-stage electron tube amplifier comprising electron discharge devices 27 and 28. The output circuit of the power amplifying device is connected through a transformer 29 to the stationary coils 18 and 19 of the phase indicating device, the coils 18 and 19 being electrically connected together. The rotor coil 17 of the indicating device carries a suitable pointer 30 which cooperates with a scale 31. The coil 17 is biased to a position at right angles to the coils 18 and 19, as shown in the drawing, by means of a spring, and when the phases of the electromotive forces are displaced 90°, whereby the average torque applied to the coil is zero, the coil is moved by the spring to this position. Any change in this 90° relation of the electromotive forces produces a torque and resulting movement of coil 17 in one direction or another depending upon the direction of the change in phase.

In the operation of the system the armature 10 is rotated at a suitable speed which preferably is substantially constant. Any suitable driving means, such as an electric motor 32, may be used and when the compass is being used on an airplane, a substantially constant speed air driven propeller may be used. Since the earth's magnetic field is fixed in direction, alternating electromotive forces induced in the armature 10 will have some definite time relation. The time relation of the electromotive force induced in the coils 21 and 22, however, obviously depends upon the angular position of the coils about the axis of the shaft 11, and since these coils are secured to the support for the armature 10 of the apparatus, their angular position about the axis of the shaft 11 depends upon the angular position of the support. The phase relation of this electromotive force with respect to the phase of the electromotive force induced in the armature 10 thus gives an indication of the angular position of the support, and when the device is being used as a compass this angular position is indicated in relation to the earth's field.

In using the compass, the ship, airplane, etc., on which the device is being used may be set on the desired course, after which coils 21 and 22 may be adjusted by means of handle 24 in order to give a predetermined position of the indicator hand 30. For example, the coils may be adjusted to bring the hand 30 to a central zero position, or a suitably calibrated scale may be provided cooperating with the coils 21 and 22 whereby the coils may be adjusted to correspond with the desired course so that the hand 30 will indicate zero when the ship has been set on this course. Any subsequent deviation in direction of the ship results in a corresponding displacement of the coils 21 and 22 about the axis of the shaft 11, whereby the indicating hand 30 is caused to move to one side or the other of zero depending upon the direction of the displacement. To maintain a given direction, therefore, the ship is steered so as to hold the indicating hand on its zero position. Gimbal supports may be provided for the armature 10 so as to stabilize it in a vertical plane.

In the modified form of my invention shown in Fig. 2 I have provided a direct current electric driving motor 35 which is energized from a storage battery 36. A slip ring 37 is provided on the shaft of the motor and this slip ring is electrically connected to one segment of the commutator 38. A primary winding 39 of the transformer has one terminal connected to a brush bearing on the slip ring 37 and its other terminal connected to an intermediate tap 40 on the battery 36. With this arrangement it will be observed that an alternating electromotive force is impressed on the transformer winding 39, this electromotive force having the same frequency as the electromotive force induced in the earth inductor coil 41 driven by the motor. It will furthermore be observed that the time phase relation of this electromotive force will vary with the angular position of the brushes 42 and 43 bearing on the commutator of the motor. It will be understood, of course, that these brushes are suitably mounted on a support which is mounted for adjustment about the axis of rotation of the motor in the manner of the coils 21 and 22 of Fig. 1. This arrangement therefore provides for the production of an alternating electromotive force having a phase relation with respect to the electromotive forces induced in the winding 41 which is dependent upon the angular position of the brushes 42 and 43.

This alternating electromotive force obtained from the driving motor as previously described is impressed on the primary winding 39 of a transformer having a secondary winding 45. The earth inductor coil 41 is connected to the input circuit of an amplifier 46, which may be of the type previously described in connection with Fig. 1. The winding 45 and the output circuits of the amplifiers 46 are connected to suitable indicating means which may be of the type shown in Fig. 1, or as shown in Fig. 2, this indicating means may consist of an integrating device such as a two-phase motor 47 provided with a rotor member 48 and suitable stationary field coils. With this arrangement it will be observed that the rotor 48 will turn upon suitable phase displacement between the two electromotive forces impressed upon the motor by the amplifiers and the direction of its rotation will depend upon the direction of displacement, or in other words, will depend upon which electromotive force leads or lags. When the electromotive forces are in phase agreement, however, the rotor 48 will come to rest.

This arrangement is used in substantially the same manner as previously described in connection with Fig. 1, the brushes 42 and 43 being adjusted so that when the ship is headed in the desired direction, the rotor 48 is stationary. As the ship proceeds any deviation in direction causes movement of the rotor in a direction corresponding with the deviation and the operator will then steer the ship to bring the rotor to rest whereby the deviation is corrected. If desired, a suitable hand, or other indicating element, may be driven by the rotor.

In the modified form of my invention shown in Fig. 3 I have shown another arrangement for obtaining an alternating electromotive force from a direct current driving motor 49. In this case two slip rings 50 and 51 are provided on the rotor shaft, these slip rings being electrically connected respectively to commutator segments which are on diametrically opposite sides of the commutator. As in the arrangement shown in Fig. 2 the phase relation of the electromotive force impressed on the slip rings 50 and 51 depends upon the angular adjustment of the brushes cooperating with the commutator. Suitable amplifying means and indicating means will be used as previously described in connection with Fig. 2.

In the modified form of my invention shown in Fig. 4 I have shown means for providing an electromotive force from the direct current output of the battery 52 supplying the output circuits of the electron tube amplifiers 53 and 54, these amplifiers being used in connection with the earth inductor coil 55. As shown, a two segment commutator 56 is connected to the rotor shaft of the inductor coil. One segment of this commutator is connected to one of the slip rings 57 to which one terminal of the inductor coil is connected. The other segment of the commutator 56 is electrically connected to an auxiliary slip ring 58. A connection is provided from this slip ring 58 through a conductor 59 to the terminal 60 of the battery, the other terminal of the battery being electrically connected to the slip ring 57 through a conductor 61 which also constitutes a part of the connections used with the electron tube amplifiers. Brushes 62 and 63 are provided cooperating with the commutator 56 at diametrically opposite points, and it will be observed that the electromotive force impressed on these brushes is an alternating one having a frequency which is the same as the frequency induced in the coil 55. It will be understood that the brushes 62 and 63 are adjustable about the axis of rotation of the coil 55 and the adjustment of these brushes is substantially the same and will be understood from the description previously given in connection with Figs. 1 and 2. The output of the brushes 62 and 63 is connected to a pair of terminals of a suitable indicating device 64, the other terminals of which are connected to the output circuits of the amplifiers 53 and 54.

It will be understood that the integrating device shown in Fig. 2 may be used in connection with the systems of Figs. 1 and 4, as well as in various other systems, in place of a simple indicating instrument, such as shown in Figs. 1 and 4. The integrating device has the advantage that it enables the operator to not only maintain a given direction but also to maintain the ship on a predetermined course. Referring to Fig. 5, assume that the ship, which may be an airplane, deviates from the predetermined course $xy$ by an angle $\theta$ so as to fly along the course $xz$ and flies along the course $xz$ for a time $t_1$ with an average velocity $v$. Under these conditions the actual distance $d$ which the ship deviates from the course $xy$ is equal to $vt_1 \sin \theta$. To get back on the course $xy$, it is necessary to overcorrect the deviation in direction by some arbitrary angle $\phi$ for a time $t_2$ sufficient to bring the indicator of the integrating instrument back to zero, at which time the ship will be at the point $a$ on the original course $xy$, i. e., the ship returns to the course when $vt_2 \sin \phi = vt_1 \sin \theta$. After arriving at $a$ the operator has only to correct the direction of the ship which he does by steering to bring the integrating instrument to rest on zero.

With the system of Fig. 2 this calculation assumes approximately average speed of the ship during the time that it is flying along the course $xz$, since the inductor coil 41 is driven by a motor supplied by a battery, and, therefore, its potential is independent of the speed. The integrating instrument will measure the distance $d$ with a variable speed of the ship however, if either one of the electromotive forces supplied to the instrument or the square root of their product can be made to vary with the speed of the ship. For example, in the system of Fig. 4 the inductor coil may be driven by a wind-operated variable speed propeller which in the case of an airplane would rotate the coil at speeds varying at approximately the speed of the airplane and hence cause the electromotive force of the inductor coil to vary with the speed.

A further advantage of the integrating type of indicating instrument such as shown in Fig. 2 is that false deflections due to swinging of the inductor coil, such as might be caused by irregular flight of an airplane, are averaged out to a great extent whereby the instrument gives the advantages of a simple indicating instrument having an extremely long period of oscillation without sacrificing sensitivity to small changes in direction.

The indicating devices may be arranged to form parts of curve drawing instruments whereby permanent records may be formed. In such case, when a direction indicating device, such as shown in Figs. 1 and 4, is used a curve would be drawn showing the deviation in direction of the ship from the predetermined course, while when an integrating device, such as shown in Fig. 2, is used a curve would be drawn showing the actual distance of the ship from the course, i. e., the distance $d$ of Fig. 5, assuming a constant speed.

Although I have described my invention with particular reference to a compass, wherein the indications are made with respect to the earth's magnetic field, it should be noted that my invention may be utilized in connection with any suitable magnetic field temporarily fixed in space with respect to which certain indications are desired. By the expression "field fixed in space" I desire not to be limited to a field permanently fixed in space. Where ever the phrase "field fixed in space" occurs in the specification and claims it is to be understood to include a field that is fixed in space during any one investigation or operation but which may be adjusted to have a different direction in space for a subsequent investigation or operation.

While I have described my invention as embodied in concrete form and as operating in a specific manner in accordance with the provisions of the patent statutes, it should be understood that I do not limit my invention thereto since various modifications thereof will suggest themselves to those skilled in the art without departing from the spirit of my invention the scope of which is set forth in the annexed claims.

What I claim as new and desire to secure by Letters Patent of the United States, is:—

1. Means for indicating the angular position of a body with respect to a magnetic field fixed in space, an electrical winding rotating in said field in which alternating electromotive forces are induced, a device for producing an alternating electromotive force, said device being provided with a rotor member and with a stator member secured to said body, and a driving connection between said rotor member and said winding whereby the phase relation of the electromotive forces of said winding and said device vary with the angular position of said body with relation to said magnetic field, and phase responsive means electrically connected to said winding and said device.

2. Means for determining the angular relation of a body with respect to a magnetic field fixed in space, comprising a winding, means for rotating said winding in said field about an axis substantially at right angles to said field whereby alternating electromotive forces are induced in said winding, a device for producing an alternating electromotive force having the same frequency as the electromotive force induced in said winding, said device being provided with rotor and stator members, a driving connection between said rotor member and said winding, said stator member being connected to said body whereby the phase relation of the electromotive forces of said winding and said device vary with the angular relation of said body with respect to said field, and phase responsive integrating indicating means electrically connected to said winding and said device.

3. Means for indicating the angular position of a body with respect to the earth's field comprising a winding, means for rotating said winding about a vertical axis whereby alternating electromotive forces are induced in said winding by the earth's field, a device for producing an alternating electromotive force, said device being provided with rotor and stator members, a driving connection between said rotor member and said winding, an adjustable connection between said stator member and said body whereby said stator member may be adjusted with relation to said body to vary the phase relation of the electromotive forces of said winding and said device, and phase responsive indicating means electrically connected to said winding and said device.

4. An earth inductor compass comprising a body, a winding, means for rotating said winding about a vertical axis whereby alternating electromotive forces are induced in said winding by the earth's field, a device for producing an alternating electromotive force, said device being provided with rotor and stator members, said stator member being secured to said body, a driving connection between said rotor member and said winding whereby the phase relation of the electromotive forces of said winding and said device depends upon the angular position of said stator member with reference to the earth's field, and a phase responsive integrating indicating instrument electrically connected to said winding and said device.

5. An earth inductor compass comprising a winding, means for rotating said winding about a vertical axis whereby alternating electromotive forces are induced in said winding by the earth's field, a body, a device for producing an alternating electromotive force, said device being provided with a stator member secured to said body, and with a rotor member having a vertical axis of rotation, and a driving connection between said winding and said rotor member whereby the phase relation of the electromotive forces of said winding and said device depends upon the angular position of said body with relation to the earth's field, an alternating current motor electrically connected to said winding and said device, and indicating means driven by said motor.

6. An earth inductor compass comprising a body, a winding, means for rotating said winding about a vertical axis whereby alternating electromotive forces are induced in said winding by the earth's field, a device for producing an alternating electromotive force provided with rotor and stator members, said rotor member being driven synchronously with said winding, said stator member being adjustably mounted on said body, a phase responsive indicating instrument electrically connected to said winding and said device, and means whereby said stator member may be adjusted about the axis of rotation of said rotor member to obtain a predetermined reading on said instrument.

7. An earth inductor compass comprising a body, a winding, means for rotating said winding about a vertical axis whereby alternating electromotive forces are induced in said winding by the earth's field, an alternating current generator provided with a stator member mounted on said body and with a rotor member driven in synchronism with said winding so as to generate an alternating electromotive force having the same frequency as the electromotive force induced in said winding, whereby the phase relation of said electromotive forces depends upon the angular position of said stator member about the axis of rotation of said rotor member, and phase responsive means electrically connected to said winding and said generator.

8. An earth inductor compass comprising a body, a winding, means for rotating said winding about a vertical axis whereby alternating electromotive forces are induced in said winding by the earth's field, a magnet rotatable with said winding, a coil inductively related with said magnet in which alternating electromotive forces are induced having the same frequency as the electromotive forces induced in said winding, said coil being mounted on said body and adjustable about the axis of rotation of said magnet to vary the phase relation of said electromotive forces, and phase responsive indicating means electrically connected to said winding and said coil.

9. An earth inductor compass comprising a body, a winding, a vertical shaft for said winding, means for rotating said shaft whereby alternating electromotive forces are induced in said winding by the earth's field, a magnet secured transversely to said shaft, a coil inductively related to said magnet in which alternating electromotive forces are induced having the same frequency as the electromotive forces induced in said winding, a support for said coil secured to said body and adjustable about the axis of rotation of said shaft to vary the phase relation of said electromotive forces, an alternating current motor electrically connected to said winding and said coil, and indicating means driven by said motor.

In witness whereof, I have hereunto set my hand this 21st day of September, 1927.

JAMES D. TEAR.

DISCLAIMER 1,774,458.—*James D. Tear*, Schenectady, N. Y. COMPASS. Patent dated August 26, 1930. Disclaimer filed April 13, 1933, by the assignee, *General Electric Company*.

Hereby enters the following disclaimer to claims 1, 3, 6, and 7 of the said Letters Patent, which are in the following words, to wit:

"1. Means for indicating the angular position of a body with respect to a magnetic field fixed in space, an electrical winding rotating in said field in which alternating electromotive forces are induced, a device for producing an alternating electromotive force, said device being provided with a rotor member and with a stator member secured to said body, and a driving connection between said rotor member and said winding whereby the phase relation of the electromotive forces of said winding and said device vary with the angular position of said body with relation to said magnetic field, and phase responsive means electrically connected to said winding and said device."

"3. Means for indicating the angular position of a body with respect to the earth's field comprising a winding, means for rotating said winding about a vertical axis whereby alternating electromotive forces are induced in said winding by the earth's field, a device for producing an alternating electromotive force, said device being provided with rotor and stator members, a driving connection between said rotor member and said winding, and adjustable connection between said stator member and said body whereby said stator member may be adjusted with relation to said body to vary the phase relation of the electromotive forces of said winding and said device, and phase responsive indicating means electrically connected to said winding and said device."

"6. An earth inductor compass comprising a body, a winding, means for rotating said winding about a vertical axis whereby alternating electromotive forces are induced in said winding by the earth's field, a device for producing an alternating electromotive force provided with rotor and stator members, said rotor member being driven synchronously with said winding, said stator member being adjustably mounted on said body, a phase responsive indicating instrument electrically connected to said winding and said device, and means whereby said stator member may be adjusted about the axis of rotation of said rotor member to obtain a predetermined reading on said instrument.

"7. An earth inductor compass comprising a body, a winding, means for rotating said winding about a vertical axis whereby alternating electromotive forces are induced in said winding by the earth's field, an alternating current generator provided with a stator member mounted on said body and with a rotor member driven in synchronism with said winding so as to generate an alternating electromotive force having the same frequency as the electromotive force induced in said winding, whereby the phase relation of said electromotive forces depends upon the angular position of said stator member about the axis of rotation of said rotor member, and phase responsive means electrically connected to said winding and said generator."

[*Official Gazette May 9, 1933.*]